No. 671,919. Patented Apr. 9, 1901.
R. M. & H. M. HICKOK.
DRAFT EQUALIZER.
(Application filed Aug. 15, 1900.)
(No Model.)
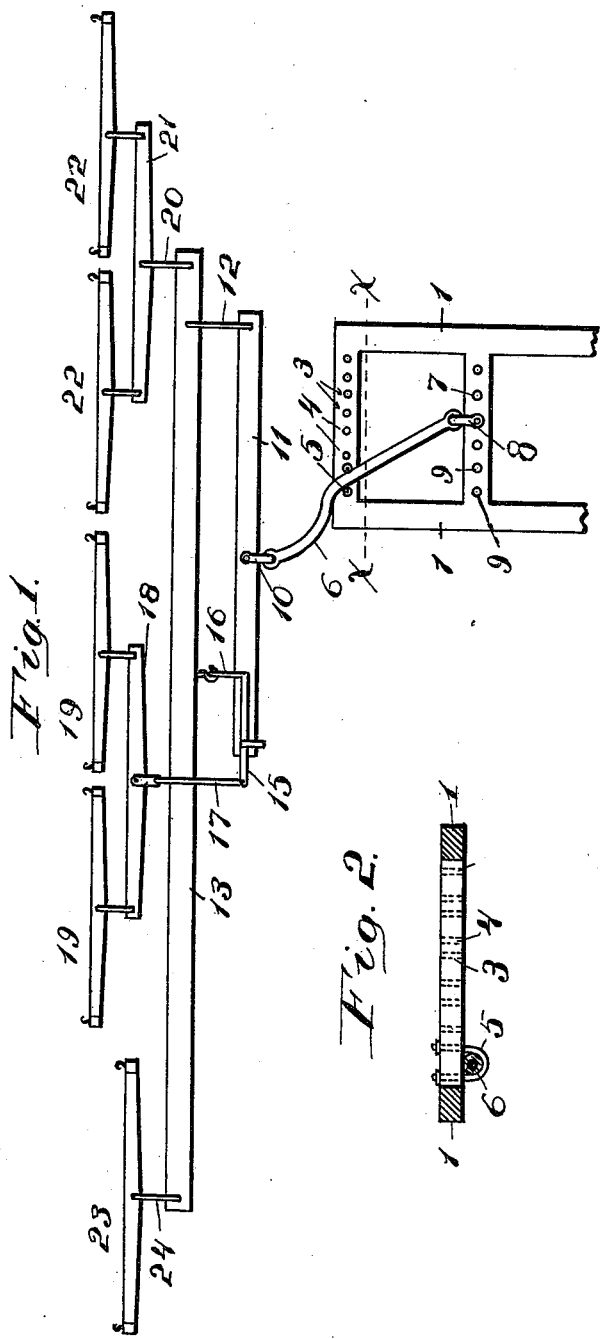
WITNESSES:
L. H. Capo
A. M. Wilson
INVENTORS
H. M. Hickok,
R. M. Hickok,
BY
ATTORNEY

UNITED STATES PATENT OFFICE.

RUFUS MARTIN HICKOK AND HENRY MADISON HICKOK, OF ALPENA, SOUTH DAKOTA; SAID RUFUS M. HICKOK ASSIGNOR TO SAID HENRY MADISON HICKOK.

DRAFT-EQUALIZER.

SPECIFICATION forming part of Letters Patent No. 671,919, dated April 9, 1901.

Application filed August 15, 1900. Serial No. 26,980. (No model.)

*To all whom it may concern:*

Be it known that we, RUFUS MARTIN HICKOK and HENRY MADISON HICKOK, citizens of the United States, and residents of Alpena, in the county of Sanborn and State of South Dakota, have invented certain new and useful Improvements in Draft-Equalizers, of which the following is a specification.

Our invention relates to draft-equalizers, and more particularly to a five-horse evener for tongue or tongueless gang-plows, or it can be applied to harvesting machines or vehicles, and has for its object to provide a device of this character in which the off horse or the horse next the plowed ground is permitted to walk in the furrow while the remaining horses walk upon the unplowed ground, and, further, to provide an equalizer of this character that is simple in construction and cheap of manufacture.

In the drawings, Figure 1 is a plan view of our improved draft-equalizer attached to the beams of a gang-plow, and Fig. 2 is a transverse section on lines $x\ x$ of Fig. 1.

Referring to the drawings, the numerals 1 1 indicate the plow-beams, the cross-piece 3 of which is provided with a series of perforations 4 to receive the ends of a U-shaped member or clip 5, through which passes the draft-bar 6, the rear end of which is connected to a cross-piece 7, secured between the plow-beams a short distance from the ends by means of a clevis-iron 8, secured in one of a series of apertures 9 in the said cross-piece 7. The apertures in the cross-pieces 3 and 7 permit of the draft-bar 6 being adjusted to the right or left, as desired.

The forward end of the draft-bar 6 is curved after it leaves the U-shaped member first to the left and then forwardly and is connected by means of a clevis or clip 10 to the short equalizing-bar 11 at a point near its center. To one end of the said bar 11 is connected by link 12 the three-horse equalizer-bar 13, while on its opposite end a short equalizing-rod 15 is centrally pivoted, one end of which rod is connected by a link 16 to the long equalizing-bar 13, while its opposite end is connected by link 17 to doubletree 18, which in turn carries the singletrees 19. The three-horse equalizing-bar 13 has connected to its off or short end by link 20 a doubletree 21, which in turn carries singletrees 22, while its opposite end extends beyond the doubletree 18 and carries singletree 23 by means of link 24.

In practice we have found that the above-described evener not only transmits a steady draft to the implement, but also tends to relieve the plow of all side draft, as well as friction on the landside.

It is obvious that by securing perforated cross-pieces to the ends of single-tongued plows or vehicles, mowing-machines, &c., our improved equalizer can be applied thereto.

Having thus described our invention, what we claim, and desire to secure by Letters Patent, is—

1. In a draft-equalizer, the combination with beam members having perforated cross-pieces, of a curved draft-bar adjustably secured to said cross-pieces by means of a clevis at its rear end and a U-shaped clip at an intermediate portion, and an equalizing device secured to its front end, substantially as described.

2. In a draft-equalizer, the combination with a suitable draft-bar, a short equalizer-bar 11 connected thereto, one end of which being secured to a three-horse equalizer-bar 13 and the other end having centrally-pivoted thereon a short equalizing-rod 15 one end of which in turn is secured to the bar 13 and its other end connected to a doubletree 18, substantially as described.

3. In a five-horse equalizer, the combination with the beam members and perforated cross-pieces, of a curved draft-bar adjustably secured to the said cross-pieces by means of a clevis and a U-shaped clip, and an equalizer-bar secured to the forward end of the said curved draft-bar, to one end of which equalizer-bar is secured a three-horse equalizer and to the other end is secured a doubletree-equalizer, substantially as set forth.

4. In a five-horse equalizer, the combination with the beam members and perforated cross-pieces, a draft-bar adjustably secured to the said cross-pieces by means of a clevis and a U-shaped clip, the said draft-bar curving after it leaves the U-shaped clip first horizontally to the left and then forwardly and secured to a short equalizer-bar 11, one end of which bar being connected to a three-horse equalizer-bar 13 and the other end having centrally-pivoted thereon a short equalizer-rod 15 one end of which in turn is secured to the bar 13 and its other end connected to a doubletree 18, and a doubletree connected to the short end of the bar 13 and a singletree secured to its opposite end extending beyond the doubletree 18, substantially as set forth.

Signed at Colorado Springs, in the county of El Paso and State of Colorado, this 9th day of July, A. D. 1900.

RUFUS MARTIN HICKOK.
HENRY MADISON HICKOK.

Witnesses as to signature of Rufus Martin Hickok:
B. H. HANCOCK,
W. A. LINDSAY.

Witnesses as to signature of Henry Madison Hickok:
C. B. STUART,
D. H. BREWSTER.